Figure 1:
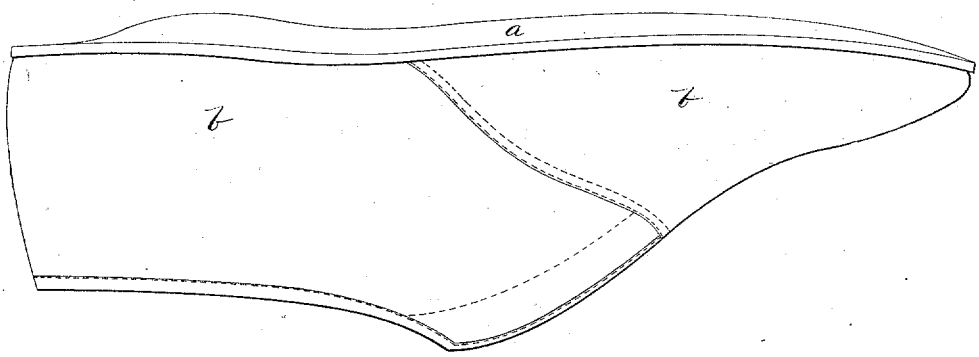

L. R. BLAKE,

Assignor, by mesne assignments, to G. McKay, Trustee of The McKay Sewing Machine Association.

Manufacture of Boots and Shoes.

No. 9,043. Reissued Jan. 13, 1880.

Witnesses.
L. F. Connor.
Jos. P. Livermore

Inventor.
Lyman R. Blake
by Crosby & Gregory Attys

UNITED STATES PATENT OFFICE.

LYMAN R. BLAKE, OF ABINGTON, MASSACHUSETTS, ASSIGNOR, BY MESNE ASSIGNMENTS, TO GORDON McKAY, TRUSTEE OF THE McKAY SEWING MACHINE ASSOCIATION.

MANUFACTURE OF BOOTS AND SHOES.

SPECIFICATION forming part of Reissued Letters Patent No. 9,043, dated January 13, 1880.

Original No. 29,561, dated August 14, 1860; extended August 13, 1874. Application for Reissue filed December 22, 1879.

*To all whom it may concern:*

Be it known that I, LYMAN R. BLAKE, of Abington, in the county of Plymouth and State of Massachusetts, have invented a new and useful Improvement in the Construction of Boots and Shoes; and I do hereby declare the following, taken in connection with the drawings which accompany and form part of this specification, and in which similar letters refer to similar parts, is a description thereof so full and exact as to enable those skilled in the art to practice my invention.

My invention relates to the manufacture of boots and shoes; and it has for its object the production of these articles in a cheaper and more expeditious manner than has hitherto been accomplished; and it is believed that boots and shoes made in accordance with my invention are superior, in all that is desirable, to such articles as have heretofore been made by hand.

The invention is limited to that part of the said manufacture in which the sole is sewed to the vamp.

My invention consists in the manner in which the vamp and sole are sewed together.

The vamps and soles of boots and shoes have been sewed together by sewing to the vamp what is well known as a "welt," and then by sewing the sole to the welt; also, by sewing through both sole and vamp by hand with a single thread so used as to be the equivalent of two threads, each end of the thread being passed through both sole and vamp from opposite sides, holes having been previously made by an awl. This latter process of uniting the soles and vamps is not, perhaps, so commonly practiced as that first mentioned, which is too well known to need particular description here. It is a difficult and tedious process to pass both ends of the thread through the sole and vamp all around the ball and the toe of the article; and part of this process has to be accomplished as follows: The thread on the outer side of the sole is passed into the awl-hole made through the vamp and sole for that purpose; its end is then caught by the fingers of the operative, or by pinchers, and drawn sufficiently far through to permit the end of the other thread to be caught in an opening then made in the first thread, and by pulling this first thread back through said hole the inner thread is drawn with it, so that it can be seized upon the outside of the sole when it is disengaged from the first thread, and then by pulling upon each thread the stitch is completed.

It is also common to sew the soles and vamps of shoes together in such a manner that the stitches do not pass through the entire thickness of the sole. In this last class of work a channel is cut at the inner side of the sole near its edge; the sole is then placed with its face side to the last, and the vamp being drawn over the last with its face next to the last is united by stitches which pass through the vamp and into the sole, coming out in the channel mentioned. This sewing is done by hand, (as are the kinds herein mentioned,) a curved awl being used to pierce the holes for the thread, which is double—that is, both ends of the thread are used.

All work put together in this last-mentioned manner is turned after being sewed, the last, of course, being withdrawn, and the shoe is again lasted and finished in the usual manner.

It is not practicable to turn heavy boots and shoes, and this process is usually confined to light low shoes, slippers, and women's and children's work.

In this my process the soles of boots and shoes are united with their vamps by the action of a mechanism which forms a seam or succession of stitches without necessitating passing the end of the thread through the material at each successive stitch and without passing the entire length of unused thread through the vamp and sole.

The mechanism which I employ to effect my purpose I have already described in the patent granted to me July 6, 1858, No. 20,775, to which reference may be had. That patent shows and describes a rest for the shoe at the end of a long curved arm projected upward from the bed and having such a form as to be capable of entering a shoe so as to carry the rest into the toe-part, or into any other part thereof. The rest is therein shown entered within a shoe (shown in dotted lines,) the last being omitted for the entrance of the rest, and the said arm, at its upper end, receives a looper, which consists of a slider carrying an eye through which the thread passes, which is engaged by the hooked needle, the hooked needle drawing the said thread upward through the shoe; and said patent also shows a wheel to press upon the outer sole at the stitch-making point.

The number of parts of which the sole is formed and their relative disposition with regard to the vamp may be varied—as, for instance, an inner sole may or may not be used, and the outer sole may be made of several thicknesses.

The sole may be channeled upon the outer side, so that in sewing the chain or interlocking of the loops falls within the groove, and the plain or single side of the seam comes within the shoe against the foot.

The tension which can be obtained upon the thread, in practice, by the use of mechanism is such that the parts through which the thread passes may be drawn closely together, and this, by the mechanism referred to, is aided by the pressure upon the stock in the immediate vicinity of the needle occasioned by the action of the feed-wheel and the resistance of the rest.

When the sewing is completed the boot or shoe is put upon the last, the channel is closed, and the article finished in the usual manner.

In lined work, which is turned after being sewed, the lining (it being outside when it is affixed to the other parts of the shoe) is larger than the vamp, and, consequently, when the shoe is turned the lining will be loose and form wrinkles next the foot, the lining thereby, in a measure, failing to take its part of the strain upon the shoe or to strengthen it. Such lining makes the shoe faulty in the fit and uncomfortable to wear, all of which failings my invention avoids.

In sewing soles to vamps prior to my invention it has always been necessary to draw the entire length of the thread between its end or ends and the stitch last formed entirely through the material, thus removing a portion of the wax upon the thread at each stitch and necessitating frequent waxing.

In sewing soles to boots and shoes it is a matter of great importance to have the thread well and uniformly waxed, for when the outside portion of the sole is worn off, and with it a portion of the stitches, so that the continuity of the thread is destroyed, the sole is only held in its place by what may be termed "staples" of thread, that act to hold the parts together like pegs. The wax in this case aids the holding-power of the stitches to an important degree.

By my improvement in sewing together soles and vamps the thread may be uniformly waxed before it is used by the machine, and each successive stitch will be uniformly waxed.

Figure 2:
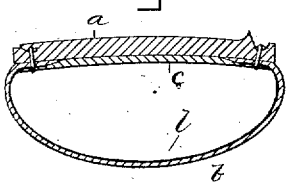
Figure 3:
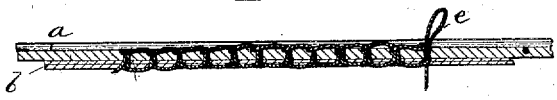

Figure 1 represents, in elevation, a shoe made according to my improvement as it appears after the sole *a* has been sewed to the vamp *b* by the waxed thread *c* and the channel closed over the stitching, as is represented at the left of Fig. 2, which is a cross-section through Fig. 1. In Fig. 2 the inner sole is represented by *e*, and the lining by the line *l*. Fig. 3 is a longitudinal vertical section through the seam, showing the stitch which is known as the "chain" or "tambour" stitch.

I am aware that it is not new to sew two or more pieces of leather together by a chain-stitch; but I am not aware that, prior to my invention, the bottoms and vamps of shoes or boots were directly united by stitches formed without passing the end and length of unused thread through the inner sole and upper.

With stitches passing through and through the bottoms and vamps I am enabled to make a saving in the time required in sewing, and, in some cases, to make a saving in stock.

The different parts of the article are brought and held in closer contact with each other than was possible by the old mode of manufacture by sewing, and by the better and more uniform waxing of each stitch the article is less liable to rip after wear than were the old articles of manufacture.

Having described my invention, what I claim therein as new, and desire to secure by Letters Patent, is—

1. That improvement in the art or method of manufacturing boots and shoes which consists in uniting the upper and sole of the shoe, from which the last is omitted during the sewing, by stitches made by drawing but a part of the thread for each stitch in loop form through the sole and upper from the inner side of the shoe, substantially as described.

2. That improvement in the art or method of uniting the soles of boots and shoes to their vamps or uppers which consists in drawing through the sole and overlapping upper, from a thread suitably presented within the shoe, a bight or loop for each stitch without drawing the end of the unused thread through the stock, and drawing the second loop from the same thread in a like manner through the material while the first loop, being locked, is tightened by the pull on the second loop.

LYMAN R. BLAKE

Witnesses:
FRANK F. STANLEY,
SAMUEL A. PORTER.